US012718483B2

(12) United States Patent
Ripoche et al.

(10) Patent No.: US 12,718,483 B2
(45) Date of Patent: Aug. 25, 2026

(54) METHOD, SYSTEM, AND COMPUTER PROGRAM FOR GENERATING 3D MODELS OF DENTURES IN OCCLUSION CONDITIONS

(71) Applicants: TROPHY SAS; CARESTREAM DENTAL LLC, Atlanta, GA (US)

(72) Inventors: Xavier Ripoche, Marne la Vallee (FR); Pascal Narcisse, Marne la Vallee (FR); Luc Gillibert, Emerainville (FR); Jean-Pascal Jacob, Marne la Vallee (FR)

( * ) Notice: Subject to any disclaimer, the term of this patent is extended or adjusted under 35 U.S.C. 154(b) by 82 days.

(21) Appl. No.: 18/369,415

(22) Filed: Sep. 18, 2023

(65) Prior Publication Data

US 2024/0144598 A1 May 2, 2024

(30) Foreign Application Priority Data

Nov. 2, 2022 (EP) .................................... 22306655

(51) Int. Cl.
*G06T 17/20* (2006.01)
*G06T 5/70* (2024.01)

(52) U.S. Cl.
CPC ................ *G06T 17/20* (2013.01); *G06T 5/70* (2024.01); *G06T 2207/10116* (2013.01); *G06T 2207/20084* (2013.01)

(58) Field of Classification Search
CPC ... A61C 13/0004; A61C 9/0046; A61C 19/05; G06T 7/11; G06T 5/70; G06T 17/20;
(Continued)

(56) References Cited

U.S. PATENT DOCUMENTS

| | | | |
|---|---|---|---|
| 7,433,810 | B2 | 10/2008 | Pavloskaia |
| 10,105,196 | B2 | 10/2018 | Fisker |

(Continued)

FOREIGN PATENT DOCUMENTS

| | | | |
|---|---|---|---|
| CN | 110428879 | A | 11/2019 |
| CN | 112535545 | B | 4/2022 |

(Continued)

OTHER PUBLICATIONS

Fan Y, Beare R, Matthews H, Schneider P, Kilpatrick N, Clement J, Claes P, Penington A, Adamson C. Marker-based watershed transform method for fully automatic mandibular segmentation from CBCT images. Dentomaxillofacial radiology. Feb. 1, 2019;48(2): 20180261.*

(Continued)

*Primary Examiner* — Phu K Nguyen

(57) ABSTRACT

According to some embodiments of the invention, it is provided a method of generating a 3D model of a first denture and of a second denture comprising:

x-ray scanning the first and the second dentures in occlusion conditions to obtain a set of data;

generating, from the obtained set of data, a 3D image of the first and the second dentures in occlusion conditions, the generated 3D image comprising voxels;

classifying each of voxels of the generated 3D image as belonging to the first denture, the second dentures, or space between the first and the second dentures; and generating, from the classified voxels, a 3D model of the first denture and of the second denture, wherein classifying a voxel of the generated 3D image is based on characteristics of neighboring voxels in the generated 3D image, according to an iterative analysis of voxels from neighbor to neighbor.

15 Claims, 7 Drawing Sheets

(58) Field of Classification Search

CPC . G06T 2207/10081; G06T 2207/30036; G06T 2207/20084; G06T 2207/10116; G06V 10/267

USPC ........................................................ 345/418

See application file for complete search history.

(56) References Cited

U.S. PATENT DOCUMENTS

| | | | | |
|---|---|---|---|---|
| 10,368,814 | B2 * | 8/2019 | Inglese | A61B 6/51 |
| 10,470,726 | B2 | 11/2019 | Ripoche | |
| 11,540,906 | B2 * | 1/2023 | Nikolskiy | A61C 9/0006 |
| 11,622,843 | B2 * | 4/2023 | Nikolskiy | G06T 7/0012 382/128 |
| 11,734,825 | B2 * | 8/2023 | Nishimura | G06T 7/0012 382/131 |
| 12,097,064 | B2 * | 9/2024 | Inglese | A61B 6/5247 |
| 2013/0108988 | A1 | 5/2013 | Simoncic | |
| 2020/0368000 | A1 | 11/2020 | Navarro | |
| 2021/0150702 | A1 * | 5/2021 | Claessen | G06T 17/10 |
| 2023/0035538 | A1 | 2/2023 | Marshall | |
| 2023/0263605 | A1 | 8/2023 | Madden | |
| 2023/0320818 | A1 * | 10/2023 | Inglese | A61B 6/51 382/131 |
| 2023/0355361 | A1 | 11/2023 | Madden | |

FOREIGN PATENT DOCUMENTS

| | | | | |
|---|---|---|---|---|
| WO | WO-2016185246 | A1 * | 11/2016 | A61B 6/4085 |
| WO | 2019002631 | A1 | 1/2019 | |
| WO | WO2022174165 | A1 | 8/2022 | |

OTHER PUBLICATIONS

Naumovich SS, Naumovich SA, Goncharenko VG. Three-dimensional reconstruction of teeth and jaws based on segmentation of CT images using watershed transformation. Dentomaxillofacial Radiology. Apr. 1, 2015;44(4):20140313.*

Xu X, Liu C, Zheng Y. 3D tooth segmentation and labeling using deep convolutional neural networks. IEEE transactions on visualization and computer graphics. May 22, 2018;25(7):2336-48.*

* cited by examiner

315″

256x256 x256 (1)

256x256x256 (32)

input image

256x256x256 (32)

128x128 (32)

output images

256x256 x256 (2)

128x128x128 (64)

64x64 (64)

128x128x128 (64)

128x128 x128 (32)

64x64x64 (96)

64x64x64 (96)

128x128x128 (32)

64x64 x64 (64)

64x64x64 (64)

32x32x32 (128)

32x32x32 (128)

32x32 x32 (96)

32x32x32 (96)

16x16x16 (128)

16x16x16 (256)

Max pool 2x2, batch normalization conv. 3x3, ReLu, batch normalization

Up-conv. 2x2 copy

Conv. 3x3

METHOD, SYSTEM, AND COMPUTER PROGRAM FOR GENERATING 3D MODELS OF DENTURES IN OCCLUSION CONDITIONS

FIELD OF THE INVENTION

The present invention relates generally to the field of dental imagery and more particularly, but not exclusively, the invention relates to a method, a system, and a computer program for generating 3D models of dentures in occlusion conditions.

BACKGROUND OF THE INVENTION

Radiological imaging is acknowledged to be of value for the dental practitioner, helping to identify various problems and to validate other measurements and observations related to the patient's teeth and supporting structures. Among x-ray systems with particular promise for improving dental care is the extra-oral imaging apparatus that is capable of obtaining one or more radiographic images in series and, where multiple images of the patient are acquired at different angles, combining these images to obtain a 3-D reconstruction showing the dentition of the jaw and other facial features for a patient. Various types of imaging apparatus have been proposed for providing volume image content of this type. In these types of systems, a radiation source and an imaging detector, maintained at a known distance (e.g., fixed or varying) from each other, synchronously revolve about the patient over a range of angles, taking a series of images by directing and detecting radiation that is directed through the patient at different angles of revolution. For example, a volume image (e.g., reconstruction of 3D or volume images) that shows the shape and dimensions of the head and jaws structure can be obtained using computed tomography (CT), such as cone-beam computed tomography (CBCT), or other volume imaging methods. The resulting volume images are acknowledged to be of particular value for obtaining useful information for assisting diagnosis and treatment.

While these technologies are proven to be efficient for imaging jaws, they are also used for other dental applications, for example to prepare orthodontic treatments or to copy dentures.

It is recalled here that a denture can be divided into two parts: the intrados and the extrados. The intrados is the denture inner surface which is to be in contact with the patient gum or intraoral structures (also called the bearing surface, the fitting surface, or the support surface). The extrados is the denture outer surface, which corresponds to the teeth and gum in the reconstructed dentition. The extrados surface includes an occlusal surface which is the surface in contact with the opposite dental arch.

The following steps are generally carried out by a practitioner to create a denture:

- adjusting the occlusal plane position,
- making an impression of both jaws with the remaining teeth and gums,
- creating a temporary positive physical model of the denture using the jaw impressions, and
- adjusting denture teeth position (vertically and laterally on a tooth by tooth basis) according to the aesthetic criteria (e.g. patient face, gums, and lips).

Since a patient may face a bone resorption which modifies locally the bearing surface for the denture, there exist situations in which a denture needs to be adapted to this change. In such a case, the practitioner needs to copy the denture before adjusting the intrados surface. Copying a denture refers to duplicating an existing denture with or without modifications of the existing denture. It is noted that the occlusal and fitting surface can be changed when copying a denture in order to consider, for example, the natural bone resorption and/or occlusion changes. Copying a denture is a tedious and complicated process. To address these drawbacks, there exist digital tools that make it possible to reduce chair time by about 75%. They also reduce production cost and improve patient experience with a better fit and fewer visits. They are generally based on using a desktop scanner for scanning the denture.

Desktop scanner is an optical scanner which makes it possible to scan the denture surface. However, a full scan is not possible in one step. Each denture must be scanned on both sides corresponding to the intrados surface and the extrados surface. Then, a third acquisition is made (vestibular) with the dentures in occlusion and the acquired intrados surface and the acquired extrados surface are registered together to provide the full denture surface.

Cone Beam Computed Tomography (CBCT) may also be used to scan dentures.

When the dentures are not in occlusion conditions, it is necessary to scan each denture and then to register the denture 3D images, which is time consuming for the practitioner. Scanning the dentures in occlusion conditions using CBCT leads to results of poor quality since it is difficult to separate the representations of the dentures in 3D images using conventional thresholding method. Moreover, the orientation of the occlusal plane is generally unknown (and that it is therefore difficult to make assumptions) and the denture material may vary from one manufacturer to another and may not be homogeneous within the denture itself (which may lead to portions of the denture having different X-ray attenuation, which in turn may impact the mesh extraction accuracy when generating 3D models).

Therefore, there is a need to improve the process of copying dentures, in particular to reduce costs and to improve patient comfort.

SUMMARY OF THE INVENTION

The present invention has been devised to address one or more of the foregoing concerns.

In this context, there is provided a method, a system, and a computer program making it possible to generate automatically 3D models of dentures in occlusion conditions.

According to an aspect of the invention, there is provided a method of generating a 3D model of a first denture and of a second denture comprising:

- x-ray scanning the first and the second dentures in occlusion conditions to obtain a set of data;
- generating, from the obtained set of data, a 3D image of the first and the second dentures in occlusion conditions, the generated 3D image comprising voxels;
- classifying each of voxels of the generated 3D image as belonging to the first denture, the second dentures, or space between the first and the second dentures; and
- generating, from the classified voxels, a 3D model of the first denture and of the second denture, wherein classifying a voxel of the generated 3D image is based on characteristics of neighboring voxels in the generated 3D image, according to an iterative analysis of voxels from neighbor to neighbor.

The method according to the invention makes it possible to generate automatically 3D models of dentures in occlusion conditions, without any knowledge regarding the orientation of the occlusal plane, and to obtain information on the occlusion in an easy, fast, and reliable way. To that end, the full denture (upper and lower jaw) is scanned only once and the obtained data are split into two 3D models (3D surfaces or 3D meshes), while ensuring a perfect fit for the patient (occlusion and bearing surface). Moreover, as the meshes are expressed in the same referential system, the practitioner does not need to adjust the meshes registering.

According to some embodiments of the invention, classifying each of voxels of the generated 3D image is based on a watershed algorithm.

Still according to some embodiments of the invention, classifying each of voxels of the generated 3D image comprises

- obtaining a 3D image representing the belonging of voxels to the dentures,
- applying an erosion algorithm to obtain a first set of voxels belonging to the first denture and a second set of voxels belonging to the second denture, the first and the second sets being separated by voxels not belonging to the dentures,
- applying an expanding algorithm to identify a surface of contact between the first and the second dentures.

Still according to some embodiments of the invention, the method further comprises obtaining an external surface of the dentures, the expanding algorithm being constrained by the obtained external surface.

Still according to some embodiments of the invention, classifying each of voxels of the generated 3D image is based on a deep neural network.

Still according to some embodiments of the invention, the deep neural network is a convolutional neural network.

Still according to some embodiments of the invention, at least a portion of the generated 3D models is obtained directly from the generated 3D image.

Still according to some embodiments of the invention, at least one of the generated 3D models is obtained by using the Marching Cubes algorithm.

Still according to some embodiments of the invention, the method further comprises applying a smoothing algorithm on a portion of at least one of the generated 3D models.

Still according to some embodiments of the invention, the generated 3D models are 3D surfaces or 3D meshes.

Still according to some embodiments of the invention, the method further comprises displaying, transmitting, and/or storing the generated 3D models.

Still according to some embodiments of the invention, scanning is a cone-beam computed tomography, CBCT, scanning.

Still according to some embodiments of the invention, at least the first or the second denture is made of several materials having different X-ray attenuation.

According to other aspects of the invention, there is provided a device comprising a processing unit configured for carrying out each step of the method described above. The other aspects of the present disclosure have advantages similar to the one above-mentioned aspect.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1A:
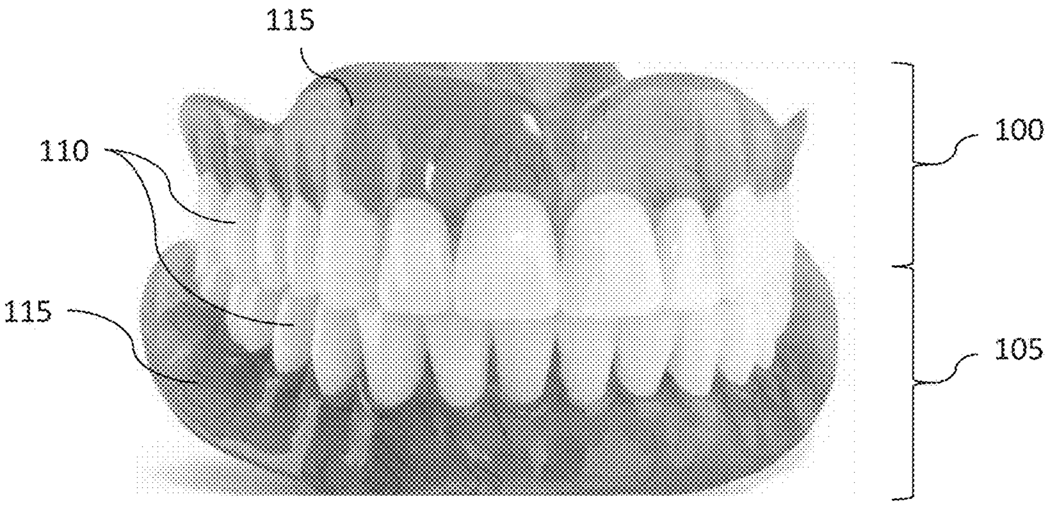
FIGS. 1*a* to 1*d* illustrate a first and a second dentures in occlusion conditions, a CBCT 3D image of a first and a second dentures in occlusion conditions, and coronal and sagittal views of the CBCT 3D image, respectively.

The following is a detailed description of particular embodiments of the invention, reference being made to the drawings in which the same reference numerals identify the same elements of structure in each of the Figures.

In the drawings and text that follow, like elements are designated with like reference numerals, and similar descriptions concerning elements and an arrangement or interaction of elements already described are omitted. Where they are used, the terms "first", "second", and so on, do not necessarily denote any ordinal or priority relation, but may simply be used to more clearly distinguish one element from another, unless specified otherwise.

In the context of the present disclosure, the terms "viewer", "operator", and "user" are considered to be equivalent and refer to the viewing practitioner, technician, or other person who acquires, views, and manipulates an X-ray image, on a display monitor. An "operator instruction," "user instruction," or "viewer instruction" is obtained from explicit commands entered by the viewer, such as by clicking a button on the system hardware or by using a computer mouse or by using a touch screen or a keyboard entry.

In the context of the present disclosure, the phrase "in signal communication" indicates that two or more devices and/or components are capable of communicating with each other via signals that travel over some type of signal path. Signal communication may be wired or wireless. The signals may be communication, power, data, or energy signals. The signal paths may include physical, electrical, magnetic, electromagnetic, optical, wired, and/or wireless connections between the first device and/or component and second device and/or component. The signal paths may also include additional devices and/or components between the first device and/or component and second device and/or component.

According to some embodiments of the invention, Cone Beam Computed Tomography (CBCT) is used to scan a first denture (e.g. a upper denture) and a second denture (e.g. a lower denture) in occlusion conditions in order to obtain 3D images that are processed to obtain a 3D model of each denture in occlusion conditions. The occlusal plane may be in any orientation. According to other embodiments, CBCT is used to scan a denture and a cast of the jaw in occlusion conditions in order to obtain 3D images that are processed to obtain a 3D model of the denture and of the cast in occlusion conditions. For the sake of clarity, the description is based on scanning a first and a second dentures in occlusion conditions to obtain a 3D model of each of the dentures, for example a 3D surface or a 3D mesh. The occlusal relationship corresponds to a maximal intercuspation.

Unless otherwise specified, the term "3D model" refers to 3D mesh or 3D surface and the term "3D Image" refers to 3D volume image.

FIGS. 1*a* to 1*d* illustrate a first and a second dentures in occlusion conditions, a CBCT 3D image of a first and a second dentures in occlusion conditions, and coronal and sagittal views of the CBCT 3D image, respectively.

As illustrated in FIG. 1*a*, each of the first and second dentures 100 and 105 (here the upper denture 100 and the lower denture 105) comprises portions corresponding to the teeth 110 and the gum 115. These portions are made of different materials, for example acrylic composite, ceramic, titanium and zirconia. These inhomogeneous materials absorb X-rays in different ways resulting in images having different gray levels, as illustrated in FIG. 1*b*, making it difficult to accurately define the contour of the different portions of the dentures using a single threshold.

Figure 1B:
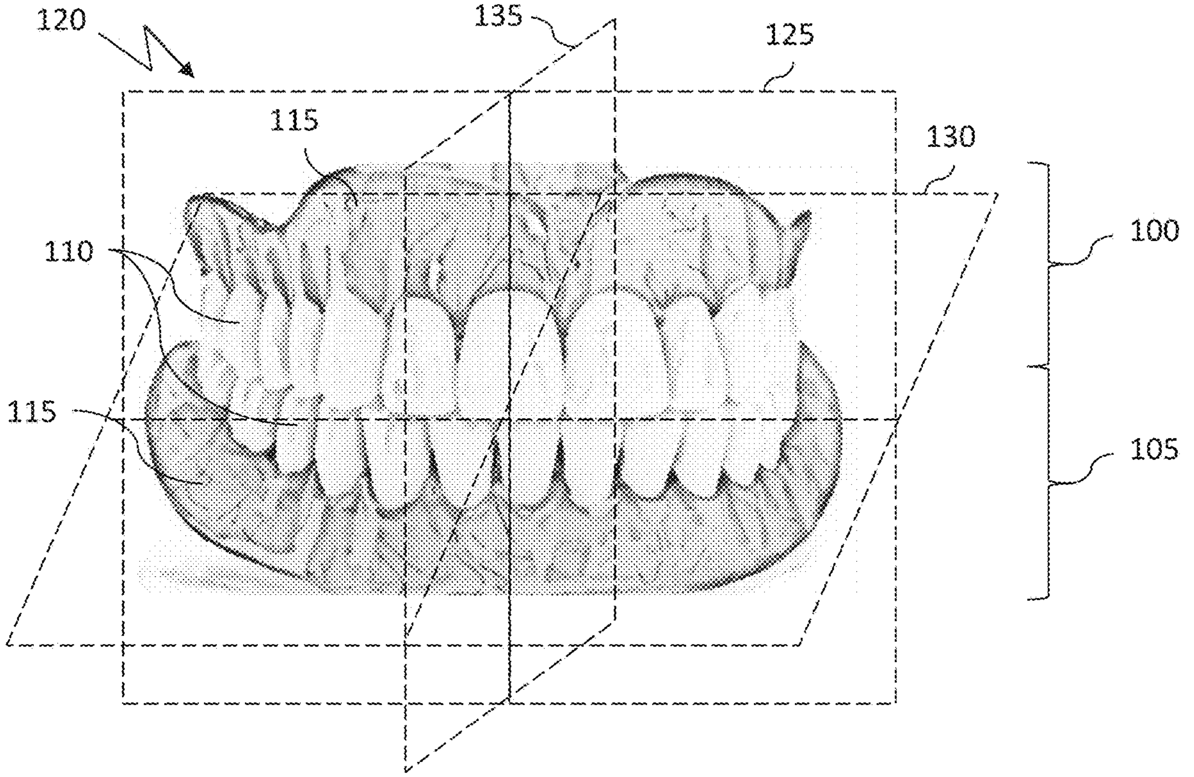

According to some embodiments of the invention, a set of X-ray images of a first and a second dentures in occlusion position, such as X-ray image 120 in FIG. 1*b*, is used to generate accurately, quickly and cost-effectively a 3D model of each of the first and second dentures.

Figure 1C:
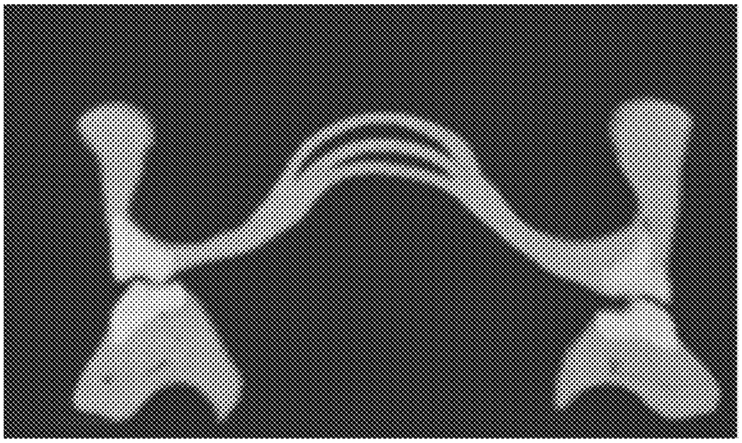
Figure 1D:
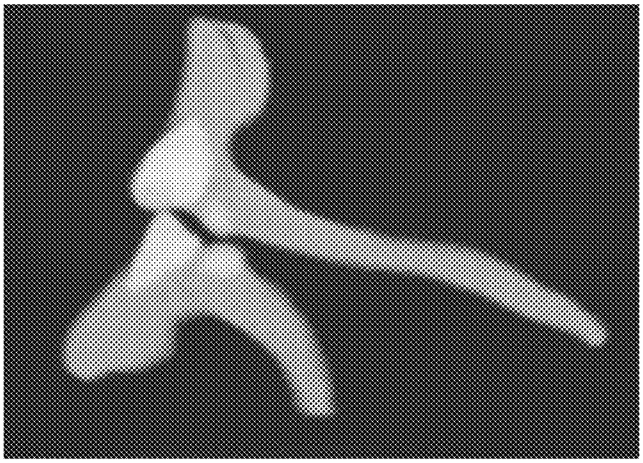

As illustrated, the first and second dentures in occlusion conditions may be viewed according to a coronal plan 125 as represented in FIG. 1*c*, an axial plan 130, and a sagittal plan 135 as represented in FIG. 1*d*.

Figure 2:
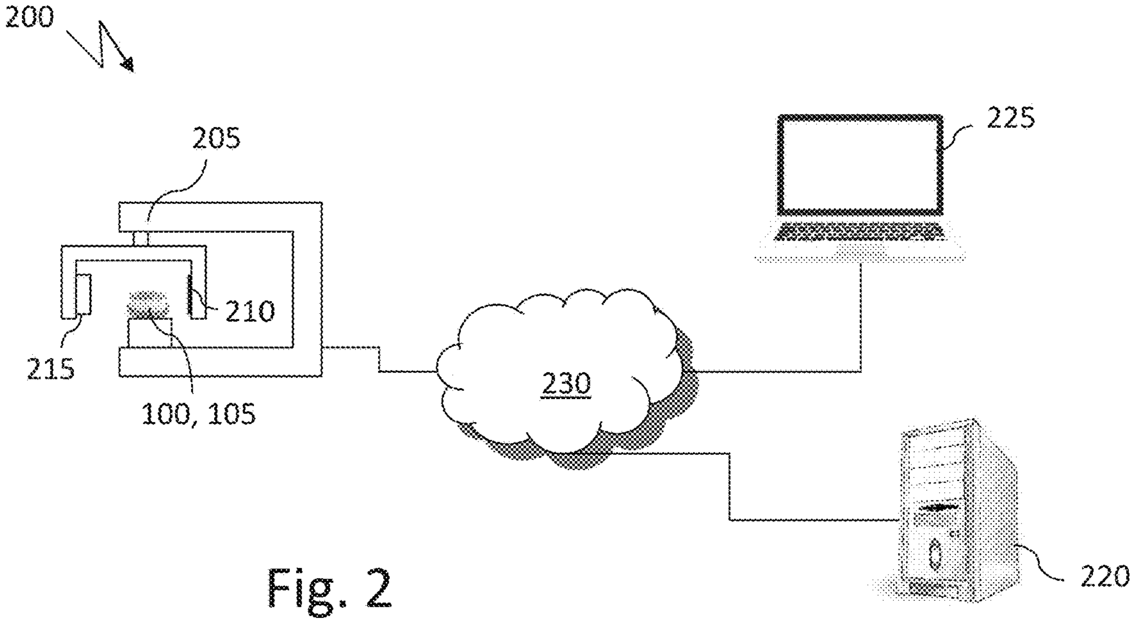
FIG. 2 is a schematic diagram that shows an imaging apparatus for CBCT imaging of an object.

FIG. 2 is a schematic diagram that shows an imaging apparatus for CBCT imaging of an object.

As illustrated, an imaging apparatus 200 can be used for acquiring, processing, and displaying a CBCT image of an object on a support, for example dentures positioned in occlusion conditions on a tray. A transport apparatus 205 rotates a detector 210 and a generator apparatus having an x-ray source 215 at least partially about a supporting position in order to acquire multiple 2D projection images used for generating (or reconstructing) a 3D volume image (referred to as a 3D image). A control logic processor, for example a control logic processor of a server 220 energizes x-ray source 215, detector 210, transport apparatus 205, and other imaging apparatus in order to obtain the image content needed for 3D imaging of the object. The control logic processor can include memory and is in signal communication with a display and/or a remote computer, for example laptop 225 for entries of operator instructions and display of image results. Server 220 and laptop 225 may be in signal communication with x-ray source 215, detector 210, transport apparatus 205, and other imaging apparatus through communication network 230.

Generating 3D Models of Dentures

Figure 3:
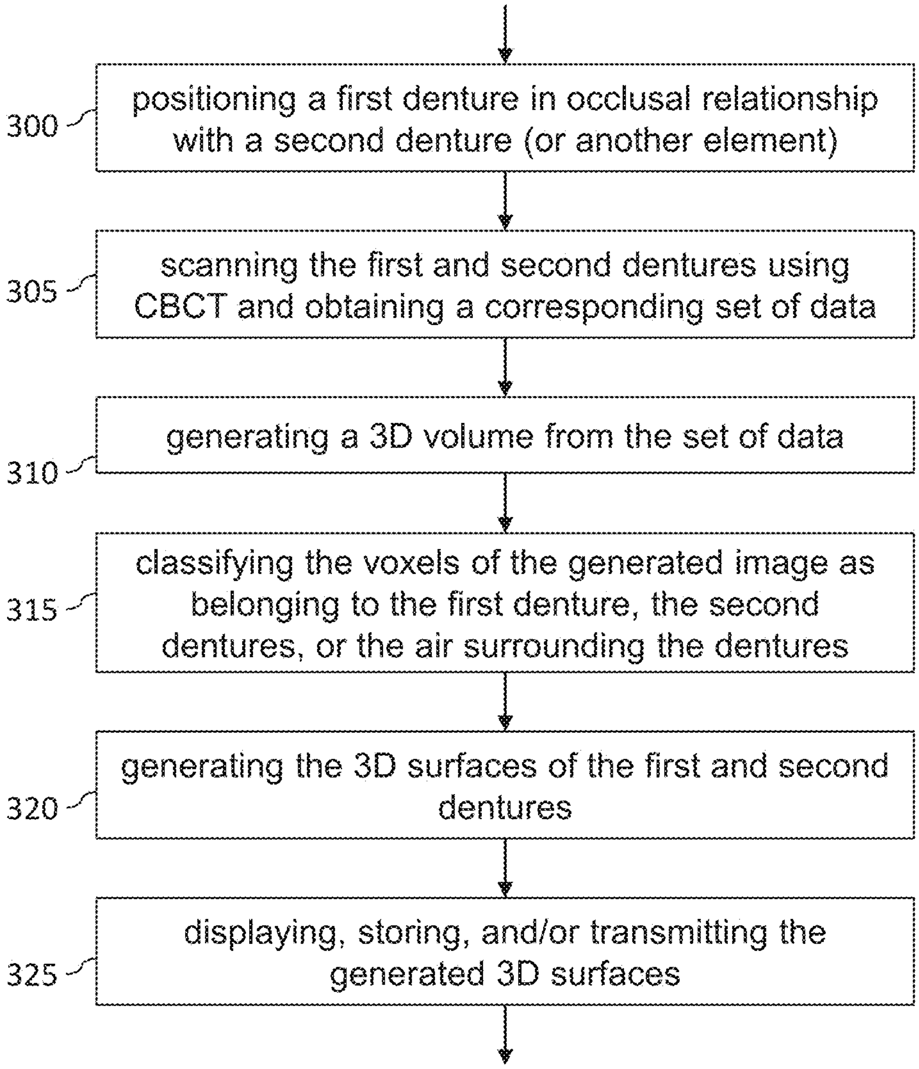
FIG. 3 illustrates an example of steps of a method for generating 3D models of dentures in occlusion conditions.

FIG. 3 illustrates an example of steps of a method for generating 3D models of dentures in occlusion conditions.

As illustrated, a first step is directed to positioning a first denture in occlusal relationship with a second denture (step 300), wherein the first and second dentures are intended to be adapted to a particular patient and the occlusal relationship corresponds to a maximal intercuspation. As disclosed above, the first or the second denture may be replaced by another element such as a dental plaster cast.

According to some embodiments and as described with reference to FIG. 2, the dentures are positioned in occlusion conditions on a tray within the CBCT imaging apparatus.

It is to be noted here that the occlusal relationship between the scanned dentures avoids the practitioner to register a first 3D model (e.g., a first 3D mesh) corresponding to the first denture on a second 3D model (e.g., a second 3D mesh) corresponding to the second denture after the 3D volume acquisition.

Next, a set of data relative to the first denture and the second denture in occlusal relationship are acquired (step 305), for example using a CBCT imaging apparatus, as described by reference to FIG. 2.

The acquired data are then processed, for example using standard algorithms, to generate one or more 3D images (step 310), that is to say one or more set of voxels forming one or more 3D volumes, all the voxels being preferably of the same size. For the sake of illustration, the voxel edge length may be between 75 and 300 micrometers. Optionally, a metal artefact reduction (MAR) algorithm may be used when generating the one or more 3D images if the denture comprises metal. An example of this algorithm is provided in EP 3 654 289. Optionally, other algorithms such as denoising algorithm or contrast enhancement algorithm may be used when generating the one or more 3D images.

Next, each voxel belonging to the first denture and each voxel belonging to the second denture are identified. For example, each voxel of a generated 3D image is classified as belonging to the first denture, the second denture, or the air surrounding the two dentures (step 315). Accordingly, a first, a second, and a third set of voxels corresponding to the first denture, the second dentures, and the air surrounding the dentures (also referred to as the background), respectively, are identified in the generated 3D image being analyzed.

While distinguishing a voxel belonging to a denture from a voxel belonging to the background can be easily done, for example by comparing the value of a voxel, possibly weighted with the value of neighboring voxels, with a threshold, distinguishing a voxel belonging to a first denture from a voxel belonging to a second denture may be more problematic, in particular where the first and the second dentures are in contact and where the contacting materials are the same or have similar X-ray attenuation. For the sake of illustration, distinguishing a voxel belonging to a first denture from a voxel belonging to a second denture may be based on a watershed approach, as described by reference to FIG. 4 to 7, or may be based on a solution using artificial intelligence (AI), for example based on deep neural networks, as described by reference to FIG. 8. It is noted that other methods could be used (e.g. graphcut, etc.).

Next, using all the voxels belonging to the first denture, a 3D model of the first denture, for example a 3D surface or 3D mesh, is generated (step 320), for example using known algorithms making it possible to generate a 3D surface corresponding to the boundaries of an object represented in a 3D volume. Likewise, using all the voxels belonging to the second denture, a 3D model of the second denture, for example a 3D surface or 3D mesh, may be generated. For the sake of illustration, step 320 may comprise applying the known Marching Cubes algorithm (which extracts a polygonal mesh of an isosurface from a three-dimensional discrete scalar field) on a 3D image wherein each voxel represents the category of the voxel among the first denture, the second denture, and the background. Another example of generating 3D models of dentures is disclosed by reference to FIG. 9.

The obtained 3D surfaces or 3D mesh may be displayed, stored, and/or transmitted (step 325). For example, the obtained 3D surfaces or 3D mesh may be stored in server 220 in FIG. 2 and transmitted to laptop 225 to be locally stored and/or displayed.

Classifying Voxels Using the Watershed Algorithm

According to some embodiments, a watershed-based algorithm is used to determine which voxels belong to the first denture and which voxels belong to the second denture. It is recalled that the watershed algorithm was introduced in 1979 by S. Beucher and C. Lantuéjoul. The basic idea consisted in placing a water source (seed) in each of the lowest points of the relief of a region, to flood the entire relief from the sources (seeds), and to build barriers when different water sources meet. The resulting set of barriers constitutes a watershed by flooding.

Figure 4:
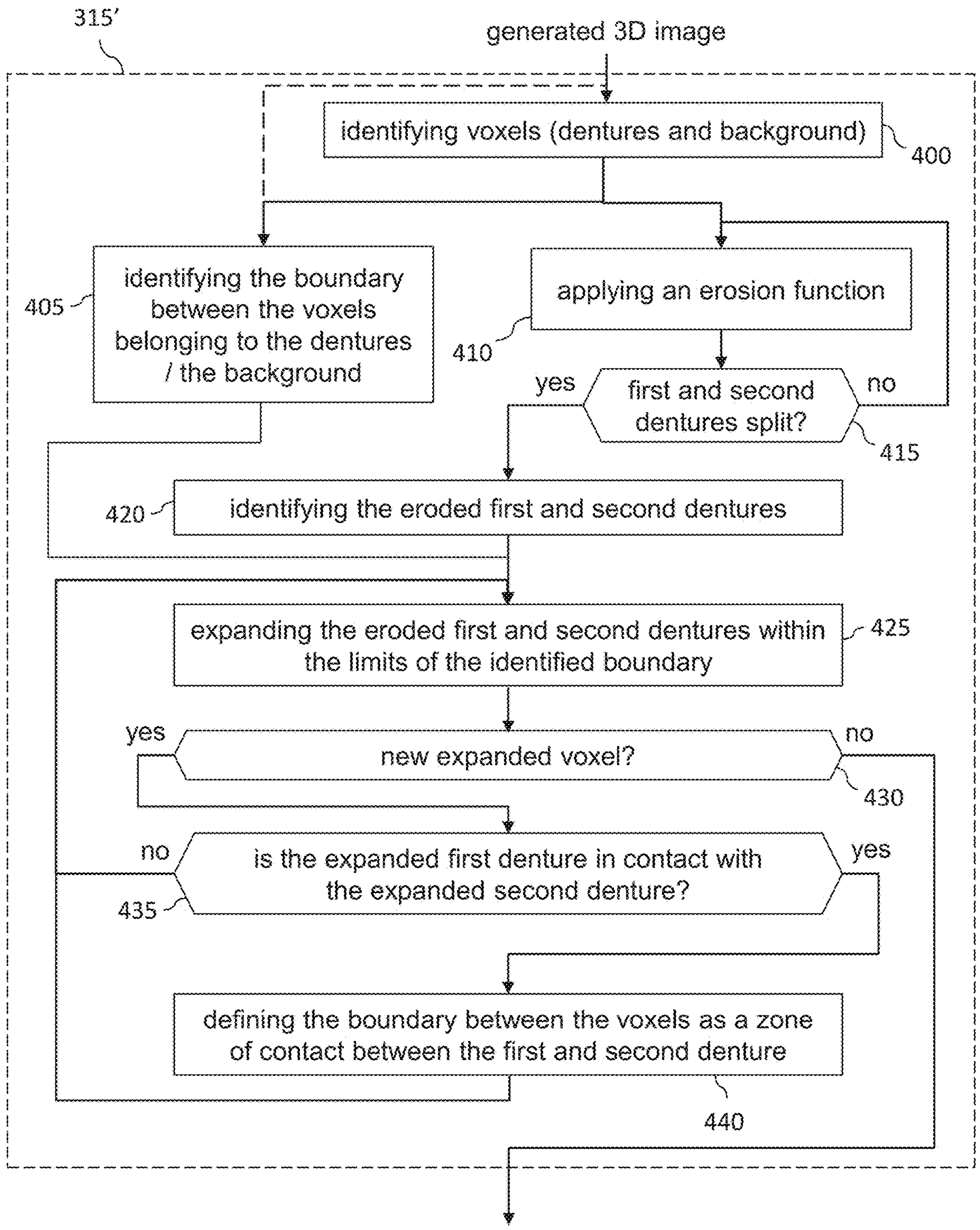
FIG. 4 illustrates an example of steps according to a first embodiment for identifying voxels belonging to the first denture and to the second denture.

FIG. 4 illustrates an example of steps according to a first embodiment for identifying voxels belonging to the first denture and to the second denture, as disclosed by reference to step 315 in FIG. 3.

As illustrated, a first step is directed to identifying voxels belonging to the dentures and voxels belonging to the background (step 400). In addition, depending on the algorithms used, some of the voxels belonging to the dentures may be classified as belonging to the first denture or to the second denture.

For the sake of illustration, identifying voxels belonging to the dentures and voxels belonging to the background may be carried out by comparing the value of each voxel, possibly weighted with the value of neighboring voxels, with a threshold (e.g., a predetermined threshold). If it is higher than the threshold, the voxel can be considered as belonging to a denture and if it is equal to or lower than the threshold, the voxel can be considered as belonging to the background. Of course, it may be the opposite. This results in a binary 3D image wherein the value of each voxel indicates whether the voxel belongs to a denture or to the background.

According to another example, at least one voxel belonging to the mandible denture and at least one voxel belonging to the maxillary denture are selected. The selection can be done automatically, for example by using some knowledge about the characteristics of the maxillary and the mandible (e.g., position, texture, etc.), or manually. The selection may be done on the generated 3D image or on slices of the generated 3D image. Once these voxels have been selected, an iterative growing or expanding algorithm is used to identify, step-by-step, the voxels belonging to the first denture and the second denture, according to an iterative analysis of voxels from neighbor to neighbor. At each iteration, each neighboring voxel of a selected voxel is analyzed to determine whether it belongs to the same structure (i.e., the first denture or the second denture). The determination may be based on the value of the voxels, possibly weighted with the value of neighboring voxels.

The region growing is implemented on the whole volume. The expansion is stopped when it is determined that a neighboring voxel of a selected voxel is different than the latter (e.g., it corresponds to a background voxel) or is a voxel already selected as belonging to the denture. All the voxels that do not belong to the dentures are deemed to belong to the background.

It is observed that in the case where the dentures comprise different types of material, the voxels initially selected are preferably selected near the occlusal part (i.e., on the teeth).

It is also observed that the first and the second dentures being in occlusion conditions, the voxels belonging to the dentures is a set of contiguous voxels.

Figure 5:
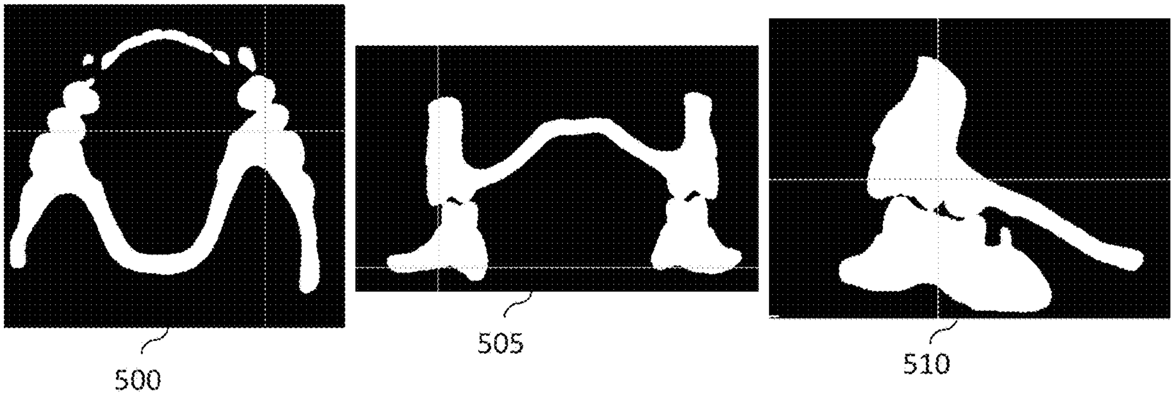
FIG. 5 illustrates an example of voxels belonging to the dentures and voxels belonging to the background, according to an axial view, a coronal view, and a sagittal view.

FIG. 5 illustrates an example of voxels belonging to the dentures (colored in white) and voxels belonging to the background (colored in black), according to an axial view (referenced 500), a coronal view (referenced 505), and a sagittal view (referenced 510).

Figure 6:
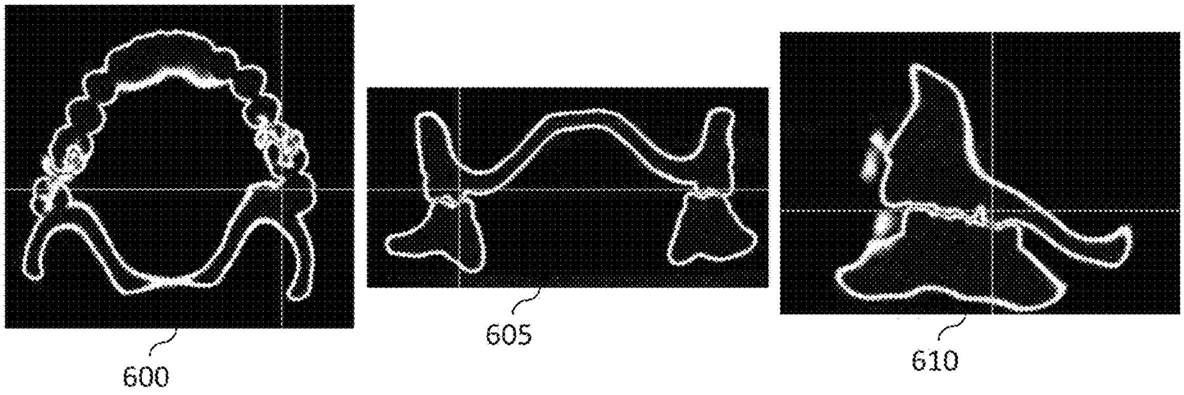
FIG. 6 illustrates an example of a boundary between voxels belonging to the dentures and voxels belonging to the background, according to an axial view, a coronal view, and a sagittal view.

Next, before or simultaneously, the boundary between the voxels belonging to the dentures and the voxels belonging to the background is obtained (step 405). This boundary may be obtained from the generated 3D image (as illustrated with the dotted arrow) by using a gradient analysis or may be obtained from the voxels as categorized in step 400. FIG. 6 illustrates an example of a boundary between voxels belonging to the dentures and voxels belonging to the background, according to an axial view (referenced 600), a coronal view (referenced 605), and a sagittal view (referenced 610).

Next, an iterative erosion algorithm is used to reduce and decompose, step-by-step, the shape formed by the voxels belonging to the dentures, in order to separate the shape of the first denture from the shape of the second denture (steps 410 and 415), according to an iterative analysis of voxels from neighbor to neighbor. At each iteration, each voxel belonging to the dentures is analyzed and voxels belonging to the dentures that are located near the limit between the voxels belonging to the dentures and the voxels belonging to the background are discarded (the limit moves during the iterations). According to the illustrated example, a test is performed after each iteration on all the remaining voxels belonging to the dentures (step 410) in order to determine whether the remaining voxels belonging to the dentures may be grouped into two sets of separated voxels representing the maxilla and the mandible (step 415).

According to some embodiments, the voxels are grouped into one or more sets of contiguous (or connected) voxels, that is to say groups of voxels belonging to the dentures that are in direct contact or that are in contact only through voxels belonging to the dentures. This may be done using a connectivity algorithm that gathers connected voxels and give them a common label. The process iterates if there is a single set of voxels. If the voxels are grouped into at least two sets of separated voxels, a test is performed on each set of voxels to determine whether it represents the maxilla or the mandible. Such a test may be based on size criteria to ignore other elements. For the sake of illustration, the maxilla or the mandible may be represented by sets of voxels having predetermined characteristics, for example a denture height equal to or higher than 5 millimeters and a denture width equal to or higher than 4 centimeters.

Once the voxels belonging to the dentures have been split into sets of voxels comprising a set representing the maxilla and a set representing the mandible (step 420), the voxels belonging to these two sets are considered as seeds of the watershed algorithm.

Figure 7:
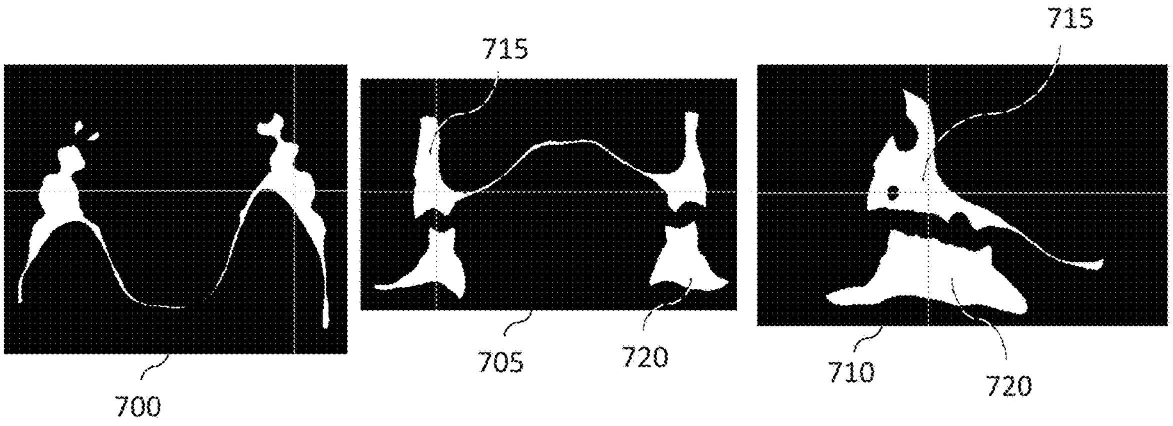
FIG. 7 illustrates an example of voxels belonging to the dentures and voxels belonging to the background, after having applied an erosion algorithm making it possible to distinguish a set of voxels representing the maxilla from a set of voxels representing the mandible, according to an axial view, a coronal view, and a sagittal view.

FIG. 7 illustrates an example of voxels belonging to the dentures and voxels belonging to the background, after having applied an erosion algorithm, making it possible to distinguish a set of voxels representing the maxilla (referenced 715) from a set of voxels representing the mandible (referenced 720), according to an axial view (referenced 700), a coronal view (referenced 705), and a sagittal view (referenced 710).

According to the watershed algorithm, an iterative growing or expanding algorithm is used to identify, step-by-step, the voxels belonging to the first denture and the voxels belonging to the second denture, starting from the voxels already identified as belonging to the first denture and the second denture, an iterative analysis of voxels from neighbor to neighbor. At each iteration, each neighboring voxel of the voxels already identified as belonging to the first denture or the second denture is analyzed to determine whether it belongs to the same structure (step 425), i.e., the first denture or the second denture, respectively. The determination may be based on the value of the voxels, possibly weighted with the value of neighboring voxels.

According to some embodiments, the expansion is constrained by the boundary between the dentures and the background, as determined in step 405, so that the voxels of the dentures cannot expand within the background of the generated 3D image.

If no new voxel is identified during an iteration (step 430), the process ends.

The expansion is locally stopped when it is determined that a neighboring voxel of voxels already identified as belonging to the first denture or the second denture is a voxel already identified as belonging to the other denture (step 435), i.e., the second denture if the considered voxel belongs to the first denture and the first denture if the considered voxel belongs to the second denture, or if it is determined that a neighboring voxel of voxels already identified as belonging to the first denture is a neighboring voxel of voxels already identified as belonging to the second denture. In such cases, the boundary between the voxel belonging to the first denture and the voxel belonging to the second denture defines a point of contact between the first denture and the second denture (step 440), a set of points of contact forming a surface of contact between the first denture and the second denture. Typically, the boundary between the voxels belonging to the first denture and the voxels belonging to the second denture is a watershed surface of one voxel thickness.

Classifying Voxels Using an AI Based Algorithm

As disclosed above and according to some particular embodiments, deep neural networks may be used to classify voxels of a generated 3D image, to identify voxels belonging to a first denture and voxels belonging to a second denture. Such deep neural networks may be derived from the convolutional neural networks known as U-Net. The U-Net network comprises a contracting path and an expansive path, forming a step-by-step analysis path, according to an iterative analysis of voxels from neighbor to neighbor. The contracting path is a typical convolutional network that consists of repeated application of convolutions, each followed by a rectified linear unit (ReLU) and a max pooling operation. During the contraction, the spatial information is reduced while feature information is increased. The expansive pathway combines the feature and spatial information through a sequence of up-convolutions and concatenations with high-resolution features from the contracting path. Artificial neural networks of the U-net type are described, for example, in the article entitled "U-net: Convolutional networks for biomedical image segmentation", Ronneberger, O., Fischer, P. & Brox, T., Medical Image Computing and Computer-Assisted Intervention—MICCAI 2015. Lecture Notes in Computer Science, 9351, 234-241 (Springer International Publishing, 2015).

Figure 8:
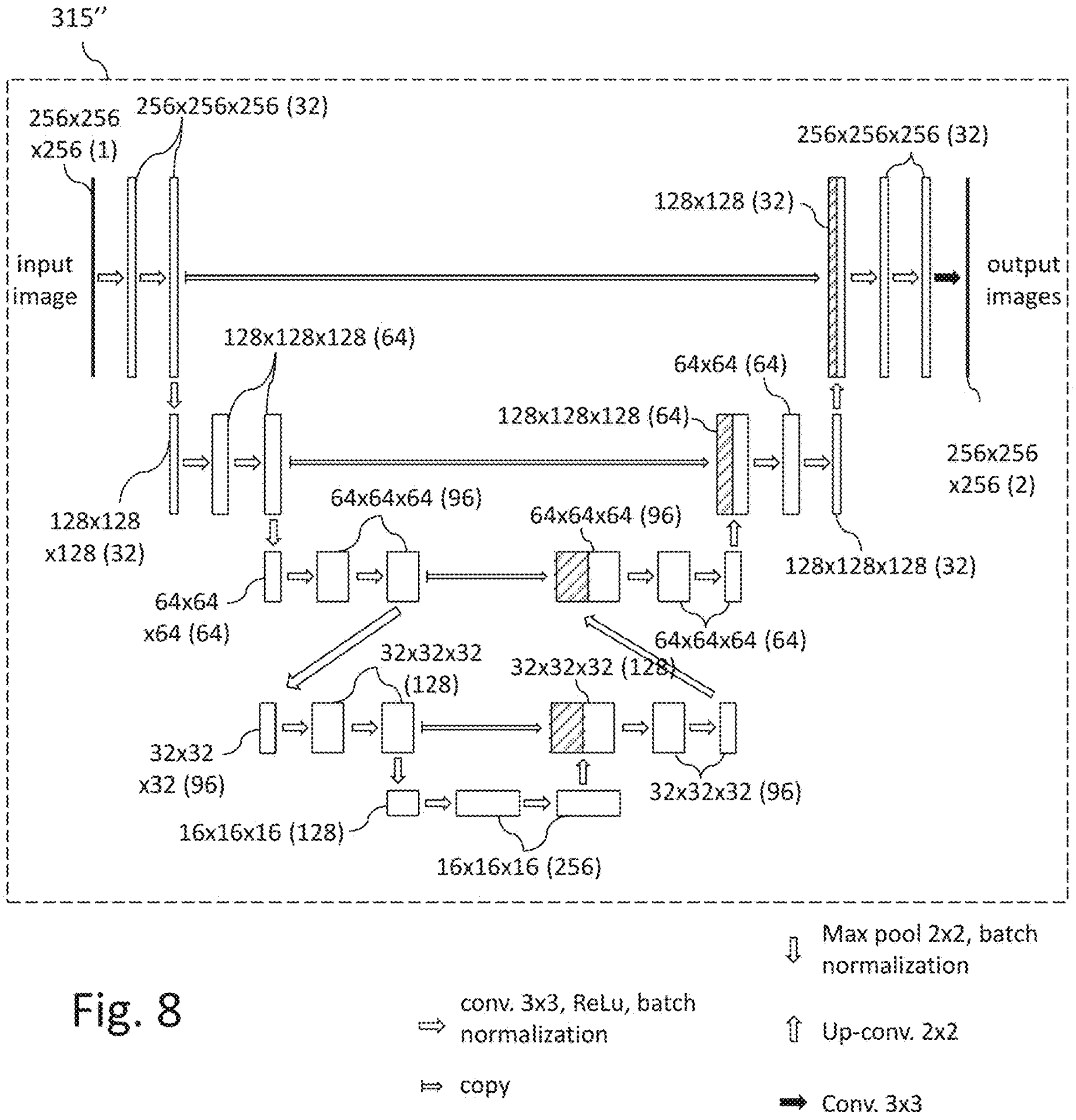
FIG. 8 illustrates an example of a deep neural network that can be used to process a generated 3D image of a first and a second dentures in occlusion conditions to identify the voxels belonging to the first denture and the voxels belonging to the second denture.

FIG. 8 illustrates an example of a deep neural network that can be used to process a generated 3D image of a first and a second dentures in occlusion conditions to identify the voxels belonging to the first denture and the voxels belonging to the second denture.

According to the illustrated example, the input of the deep neural network is a generated 3D image having 256×256×256 voxels, that may be coded on one byte each, and the output comprises two 3D images having 256×256×256 voxels, corresponding to the maxilla and the mandible, respectively, that may also be coded on one byte each. Each box represents a multi-channel feature map. The x, y, and z size of the feature map is given by the first three numbers of the label associated with the box and the number of channels is provided with the fourth number (between brackets). The crosshatched boxes represent copied feature maps and the arrows denote the operations as indicated in FIG. 8. Since the two output volumes are expressed in the same reference frame, the occlusal information is kept.

It is to be noted that other types and/or sizes of inputs and outputs may be used. For example, the input may be obtained by using a 3D sliding window.

As illustrated, the architecture of the deep neural network comprises a contracting path (left side) and an expansive path (right side). The contracting path aims at applying several times a double 3×3 convolution, followed by a rectified linear unit (ReLU) and a 2×2 max pooling operation with stride 2 for down-sampling. At each down-sampling step, the number of feature channels is doubled. Conversely, the expansive path aims at up-sampling of a feature map, which is followed by a 3×3 convolution ("up-convolution") that halves the number of feature channels, a concatenation with the correspondingly cropped feature map from the contracting path, and two 3×3 convolutions, each followed by a ReLU. At the final layer, a 1×1 convolution is used to map each 32-component feature vector to the two classes, each representing a 3D model of the maxilla or of the mandible.

According to some embodiments, the deep neural network illustrated in FIG. 8 is trained with real-life data where the correct identification of the maxilla and the mandible have been determined by experts. For the sake of illustration, a database with 500 3D images (e.g., CBCT volumes), where the maxilla and mandible are present, and identified may be used. This database is split in a training set, a testing set, and a validation set and used for training.

It is noted that while the deep neural network illustrated in FIG. 8 has proven its effectiveness, some parameters may be changed, such as the size of the feature maps and/or the number of channels.

Improving 3D Model Rendering

Figure 9:
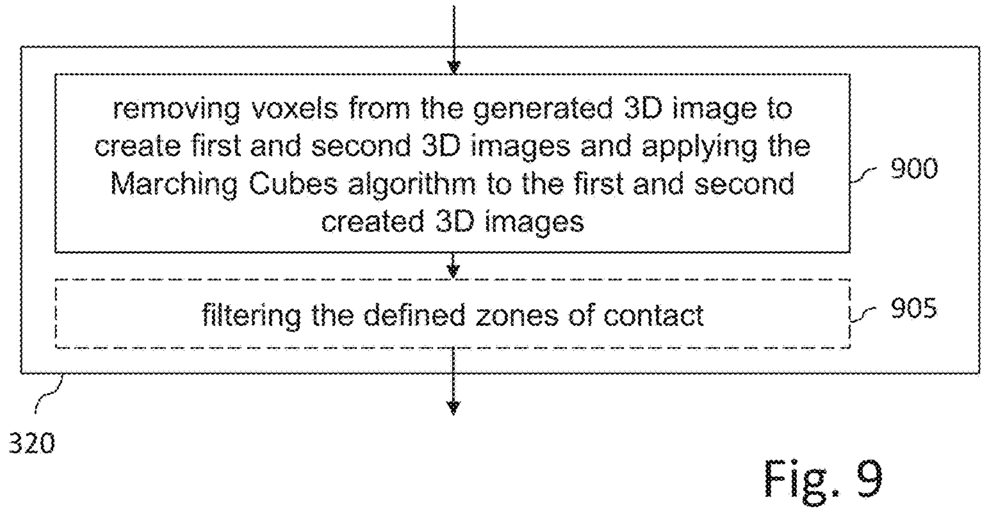
FIG. 9 illustrates an example of steps that may be used when generating the 3D model of the first denture and of the second denture to improve their accuracy.

FIG. 9 illustrates an example of steps that may be used for generating the 3D model of the first denture and of the second denture to improve their accuracy.

As illustrated a first step (step 900) is directed to obtaining a surface of the first denture and a surface of the second denture. To that end, the voxels belonging to the second denture (e.g. as obtained by using the algorithm described by reference to FIG. 4 or by using a deep neural network such as the one described by reference to FIG. 8) are removed from the generated 3D image (e.g. replacing the value of the voxels belonging to the second denture by a predetermined value such as the value of the voxels belonging the background) to create a first 3D image of the background and the first denture only. Likewise, the voxels belonging to the first denture (e.g. as obtained by using the algorithm described by reference to FIG. 4 or by using a deep neural network such as the one described by reference to FIG. 8) are removed from the generated 3D image (e.g. replacing the value of the voxels belonging to the first denture by a predetermined value such as the value of the voxels belonging the background) to create a second 3D image of the background and the second denture only.

Figure 10:
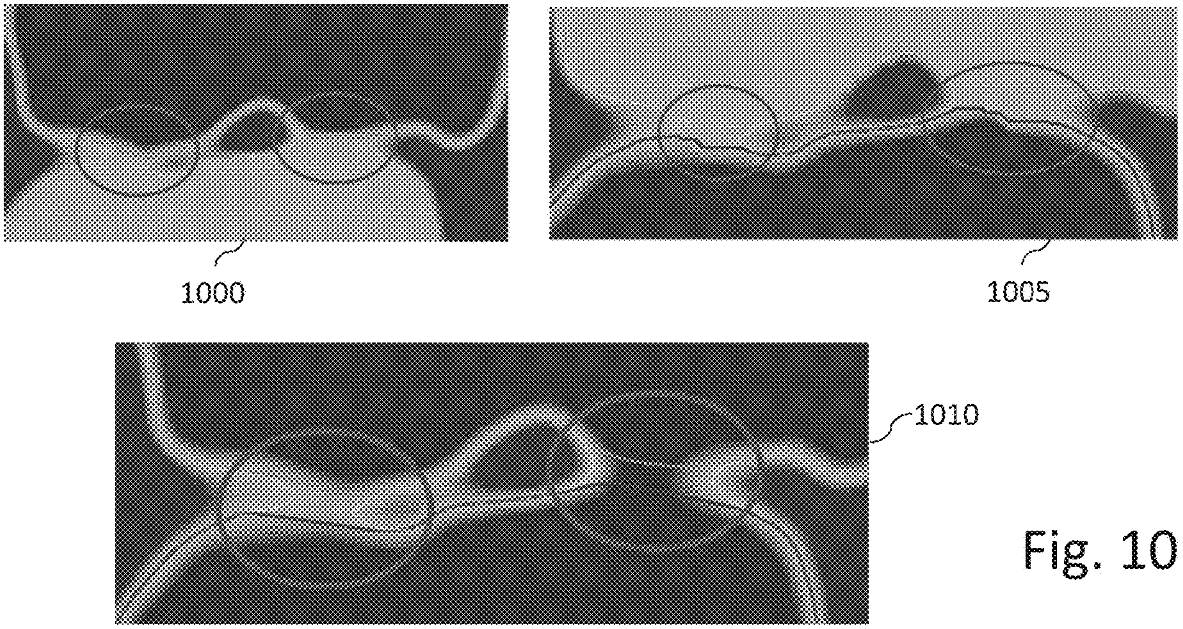
FIG. 10 illustrates an example of smoothing a surface of contact of a maxilla and of a mandible.

Next, the known Marching Cubes algorithm is applied to each of the first and second created 3D images. The result consists in two surfaces representing each of the dentures, as illustrated in FIG. 10 with references 1000 and 1005).

Next, an optional step may consist in smoothing the surface of contact (step 905), i.e. the occlusal area, to correct local discontinuities, using a standard smoothing algorithm, for the surface of the first denture and for the surface of the second denture. This can be done, for example, by using a sliding average function. Again, this can be done independently for the maxilla and the mandible, as illustrated in FIG. 10 with reference 1010, wherein the surfaces of the first and second dentures have been superimposed to the generated 3D image.

Examples of smoothing algorithms are disclosed in the papers referenced "Laplacian-isoparametric grid generation scheme", Herrmann, Leonard R., 1976, Journal of the Engineering Mechanics Division, 102 (5), 749-756 and "Laplacian Surface Editing", Sorkine, O., Cohen-Or, D., Lipman, Y., Alexa, M., Rössl, C., Seidel, H.-P., 2004, Proceedings of the 2004 Eurographics/ACM SIGGRAPH Symposium on Geometry Processing. SGP '04. Nice, France: ACM. pp. 175-184.

It is noted here that the surface of contact of the first denture (respectively of the second denture) may be defined as the surface of the first denture (respectively of the second denture) that is close to the surface of the second denture (respectively of the first denture). For the sake of illustration, a voxel of the first denture may be considered as close to a voxel of the second denture when they are in contact or when there is only one voxel of the background that separates these two voxels.

FIG. 10 illustrates an example of smoothing a surface of contact of a maxilla (reference 1000) and of a mandible (reference 1005). As represented (reference 1010), this allows for a certain continuity in the surface of the first and second dentures.

According to some embodiments, the smoothing algorithm may be applied directly on the generated surfaces from the 3D image wherein each voxel represents the category of the voxel among the first denture, the second denture, and the background, as described by reference to step 315 and 320 in FIG. 3.

Other optional steps may be directed to

- adjusting locally the generated 3D image (e.g., on regions representing the dentures) according to a gray level threshold isosurface value,
- selecting a gray level threshold isosurface value from a threshold list based on physical model material,
- using a gray level threshold isosurface value that is different for filtering regions representing the dentures and regions representing the background, and/or
- adjusting a gray level threshold isosurface value after having processing at least a region representing the dentures.

Figure 11:
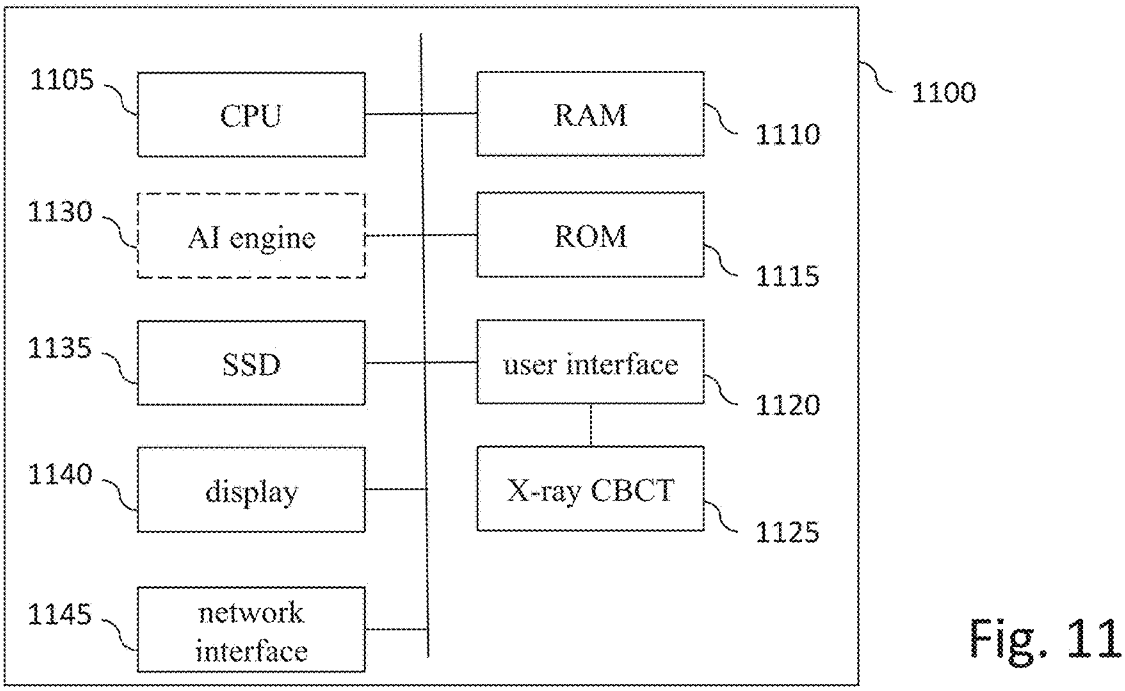
FIG. 11 is a schematic block diagram of a computing device for implementation of one or more embodiments of the invention.

Example of Hardware to Carry Out Steps of the Method of Embodiments of the Present Disclosure FIG. 11 is a schematic block diagram of computing device for implementation of one or more embodiments of the invention, in particular for carrying out the steps or parts of the steps described by reference to FIGS. 3, 4, 8, and 9.

Computing device 1100 comprises a communication bus that may be connected to all or some of the following elements:

- a central processing unit 1105, such as a microprocessor, denoted CPU;
- a random access memory 1110, denoted RAM, for storing the executable code of the method of some embodiments of the invention as well as the registers adapted to record variables and parameters necessary for implementing a method for generating a 3D model for each of a first and a second dentures from a single 3D image of the first and second dentures in occlusion conditions according to some embodiments of the invention, the memory capacity of which can be expanded by an optional RAM connected to an expansion port for example;
- a read-only memory 1115, denoted ROM, for storing computer programs for implementing some embodiments of the invention;
- a user interface and/or an input/output interface 1120 which can be used for receiving inputs from a user, providing information to a user, and/or receiving/sending data from/to internal sensors and/or external devices, in particular receiving data from a sensor such as x-ray sensor 210 in FIG. 2, which may be embedded within a CBCT imaging apparatus that may be connected to computing device 1100 via wires or through a wireless link; and
- depending on the embodiment, an AI engine 1130.

Optionally, the communication bus of computing device 1100 may be connected to a solid-state disk 1135 denoted SSD (or a hard disk) used as a mass storage device, an X-ray CBCT 1125, and/or a display 1140.

The communication bus of computing device 1100 may also be connected to a network interface 1145 typically connected to a communication network over which digital data can be transmitted or received for receiving/sending data from/to remote devices, in particular to a dental information system and/or storage device 1135. The network interface 1145 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1105

The executable code may be stored either in read-only memory 1115, on solid state device 1135 or on a removable digital medium such as for example a memory card. According to a variant, the executable code of the programs can be received by means of a communication network, via the network interface 1134, in order to be stored in one of the storage means of the computing device 1100, such as solid-state device 1135, before being executed.

Central processing unit 1105 is adapted to control and direct the execution of the instructions or portions of software code of the program or programs according to some embodiments of the invention, the instructions being stored in one of the aforementioned storage means. After powering on, CPU 1105 is capable of executing instructions from main RAM memory 1110 relating to a software application after those instructions have been loaded from ROM 1115 or from solid-state device 1135 for example. Such a software application, when executed by CPU 1105, causes the steps herein disclosed to be performed.

Any step herein disclosed may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present disclosure has been described herein above with reference to some specific embodiments, the present invention is not limited to these specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of generating a 3D model of a first denture and of a second denture, the method comprising the steps of:

x-ray scanning the first and the second dentures in occlusion conditions to obtain a set of data;

generating, from the obtained set of data, a 3D image of the first and the second dentures in occlusion conditions, the generated 3D image comprising voxels;

classifying each of voxels of the generated 3D image as belonging to the first denture, the second dentures, or space between the first and the second dentures; and generating, from the classified voxels, a 3D model of the first denture and of the second denture, wherein classifying a voxel of the generated 3D image is based on characteristics of neighboring voxels in the generated 3D image, according to an iterative analysis of voxels from neighbor to neighbor.

2. The method of claim 1, wherein classifying each of voxels of the generated 3D image is based on a watershed algorithm.

3. The method of claim 2, wherein classifying each of voxels of the generated 3D image comprises obtaining a 3D image representing the belonging of voxels to the dentures, applying an erosion algorithm to obtain a first set of voxels belonging to the first denture and a second set of voxels belonging to the second denture, the first and the second sets being separated by voxels not belonging to the dentures, and applying an expanding algorithm to identify a surface of contact between the first and the second dentures.

4. The method of claim 3, further comprising obtaining an external surface of the dentures, the expanding algorithm being constrained by the obtained external surface.

5. The method of claim 1, wherein classifying each of voxels of the generated 3D image is based on a deep neural network.

6. The method of claim 5, wherein the deep neural network is a convolutional neural network.

7. The method of claim 1, wherein at least a portion of the generated 3D models is obtained directly from the generated 3D image.

8. The method of claim 1, wherein at least one of the generated 3D models is obtained by using the Marching Cubes algorithm.

9. The method of claim 1, further comprising applying a smoothing algorithm on a portion of at least one of the generated 3D models.

10. The method of claim 1, wherein the generated 3D models are 3D surfaces or 3D meshes.

11. The method of claim 1, further comprising displaying, transmitting, and/or storing the generated 3D models.

12. The method of claim 1, wherein scanning is a cone-beam computed tomography, CBCT, scanning.

13. The method of claim 1, wherein at least the first or the second denture is made of several materials having different X-ray attenuation.

14. A nontransitory, computer readable computer program product for a programmable apparatus, the computer program product comprising a sequence of instructions for implementing each of the steps of the method according claim 1 when loaded into and executed by the programmable apparatus.

15. A device comprising a processing unit configured for carrying out each of the steps of the method according to claim 1.

* * * * *